Patented Oct. 27, 1953

2,657,183

UNITED STATES PATENT OFFICE 2,657,183

PROCESS OF PREPARING A HOMOGENEOUS AQUEOUS COLLOIDAL DISPERSION OF SILICA AND A HYDROUS OXIDE OF ZINC, ALUMINUM, TIN, OR COLUMBIUM AND THE RESULTING PRODUCT

Max Fredrick Bechtold, Kennett Square, Pa., assignor to E. I. du Pont de Nemours & Company, Wilmington, Del., a corporation of Delaware No Drawing. Application August 9, 1949,
Serial No. 109,422

10 Claims. (Cl. 252—313)

This invention relates to processes for producing aqueous dispersions containing silicic acid associated with a hydrous oxide of zinc, aluminum, tin, or columbium, and to the compositions produced, and is more particularly directed to processes in which contact is effected between a cation exchange resin and an aqueous solution containing an alkali-metal silicate together with an alkali-metal salt having an anion selected from the group consisting of zincate, aluminate, stannate, and columbate ions, and to the so-produced aqueous solutions or dispersions, which contain colloidal silica associated with the colloidal hydrous oxide corresponding to the zincate, aluminate, stannate or columbate, and which are stable against gelling for at least one day.

Ion exchange reactions have been widely used for removing undesired ions from solutions in such fields as water treatment, the principal object being to obtain water as free of ions as possible or at least containing no undesirable ions. Thus, the zeolite water softeners substitute sodium ions for the calcium ions of hard water and thereby impart softness, the object being to obtain a water having improved usefulness.

More recently it has been proposed to use ion exchange reactions to form aqueous dispersions, that is, molecular and colloidal solutions, of substances which are not otherwise readily available in this form. Here the objective is to produce the dispersed material in a form having utility. United States Patent 2,244,325 issued June 3, 1941, to Paul G. Bird, for instance, discloses that sodium silicate may be passed through an acid-treated ion-exchange material to remove sodium ions, whereby a colloidal solution of silica is obtained. The solution is useful on account of its silica content. This patent also discloses that colloidal solutions of tungstic acid, molybdenum trioxide, antimonic acid, vanadium oxide or vanadic acid and germanium oxide may be produced in a similar manner, the object again being to obtain the acids or hydrous oxides in a useful form.

It has been found, however, that there are some hydrous oxides which are not readily obtainable in aqueous dispersion by this method. Thus, if one attempts to produce an aqueous colloidal solution of hydrous aluminum oxide, for instance, by passing sodium aluminate through a cation exchange resin it is found that the hydrous aluminum oxide gels within the resin bed and little if any hydrous oxide is obtained in the effluent. Stannates, zincates, and columbates behave in like manner and it has heretofore been considered impossible to produce by cation exchange methods molecular or colloidal dispersions comprising appreciable concentrations of the hydrous oxides of aluminum, tin, zinc, and columbium.

Now, according to the present invention it has been found that aqueous dispersions containing the hydrous oxides of aluminum, tin, zinc, or columbium that are stable for at least one day may be produced by cation exchange methods from the salts of such hydrous oxides, if there is included in the solution passing through the ion exchange resin an alkali metal silicate such as sodium silicate. The presence of the sodium silicate acts to stabilize the system against gelation so that stoppage of the resin bed does not occur. The chemical reactions responsible for this surprising result are not fully understood. However, it is believed that low molecular weight silicic acid and the low molecular weight metal acid are generated simultaneously by cation-exchange of the homogeneous solution of the corresponding essentially monomolecular salts. It is probable that under the conditions of continuous column exchange, in which chemical equilibria are constantly unbalanced, the low molecular weight hydrous oxides (metal hydroxides or metal acids) have maximum opportunity to react. Thus, an association of functional hydroxy groups of silicic acid with those of aluminum hydroxide, or with the hydroxides of zinc, tin, or columbium, can occur before the homopolymerization of any of these hydroxides can take place to any appreciable extent. In the case of aluminum hydroxide, for example, homopolymerization leads to rapid gelation and plugging of the exchange column. Thus, the stable solutions produced in accordance with the process of this invention are believed to contain silicic acid in chemical association with the other metal acids or hydroxides. These solutions are characterized by their stability and molecular homogeneity, as distinguished from suspensions of mixtures of silica and other metal oxides produced by other methods.

Ion exchange processes are necessarily cyclic operations. The solution to be treated is subjected to contact with an ion exchange resin—in the present case, a resin capable of combining with cations—until the concentration of undesired ions is reduced to the desired degree. The solution is then drawn off as product and may be concentrated if desired. To the extent that the ion exchange resin takes up cations it of course becomes ineffective for further reaction.

Ultimately, therefore, the ion exchange resin must be renewed or regenerated, and this may be done after the product solution has been drawn off, by washing the resin, treating it with an acid solution, such as a sulfuric acid solution, and then washing out excess acid.

The ion exchange resin may be confined in a column through which the solution to be treated is caused to flow, as by gravity or by pumping, or the resin, preferably in granular form, may be dispersed in the solution as by agitation and may then be filtered off or settled out after the desired ion exchange has occurred. In practice it has been found that the use of columns packed with the ion exchange resin is the preferred manner of operation.

To carry out a process of this invention an aqueous solution of a mixture of an alkali metal silicate with an alkali metal zincate, aluminate, stannate, or columbate is brought into contact with the cation-exchange resin. Best results are obtained if the solution is relatively dilute and it is particularly preferred that the solution contain not more than about 4% by weight of total solids, calculated as the mixed oxides. Obviously the solution should not be too dilute, however, and it is ordinarily uneconomic to use a solution containing less than about 0.1% by weight of total solids.

In a particularly preferred embodiment of the invention a solution containing from 1 to 2% by weight of combined alkali metal silicate and alkali metal zincate, stannate, aluminate, or columbate, calculated as the oxides, may be used. Maximum rate of production of final product at minimum expense is, of course, obtained with higher solids content but this advantage is offset to some extent by a reduced yield of hydrous oxides obtained as product, based on input, and hence it is preferred to use the lower concentration. When the concentration is too high or when the ratio of other hydrous metal oxide to silicon dioxide is too high there is a tendency toward undue inactivation of the cationic-exchange resin and toward gelation of the product.

The proportion of alkali metal silicate to alkali metal zincate, aluminate, stannate, or columbate in a solution treated according to this invention preferably should be in the range from 1:1 to 99:1 on a molar basis calculated as the anhydrous oxides. That is, the mol ratios, $SiO_2:ZnO$, $SiO_2:Al_2O_3$, $SiO_2:SnO_2$, or $SiO_2:Cb_2O_5$ should be from 1:1 to 99:1.

The term "alkali metal" as used in describing the salts employed in a process of this invention will be understood to include lithium, sodium, potassium, and rubidium, but it is particularly preferred to use the sodium or potassium salts.

In carrying out the process of the invention a solution is prepared containing the alkali metal silicate and the alkali metal salt of the hydrous oxide desired in the product. To do this the silicate and other metal salt may be separately dissolved and the solutions mixed, or the silicate and salt may be dissolved to make a common solution. The former practice is preferred because in some instances the common solutions are unstable and gel upon long standing. For example, sodium silicate-sodium aluminate solutions are unstable toward gelation, particularly when the $SiO_2:Al_2O_3$ mol ratio is from 3:1 to 4:1. It is also preferred to hold to a minimum the time between the mixing of the silicate and other metal solution and the actual passage into contact with the ion exchange resin. Thus, it is desirable to mix the solutions immediately before passing the mixed solution over the ion exchange resin.

The tendency toward gelation of the mixed solutions may be minimized in some instances by proper selection of the particular alkali metal salt used. For instance, mixed solutions containing potassium silicate and potassium zincate are more stable than the mixed solutions of the corresponding sodium salts. The potassium zincate may be prepared by dissolving zinc carbonate in aqueous potassium hydroxide solution. During cation exchange, most of the carbonate ion is removed as carbon dioxide.

The cation-exchange resins used in the processes of this invention may be inorganic or organic, and may be of natural or synthetic origin. Typical of the natural inorganic cationic reagents are processed green sands and clays, and typical of synthetic cationic reagents are the gel zeolites. Examples of organic cationic ion exchangers are sulfuric acid-treated coals, wood, waste, petroleum sludge, or lignin, and resins of the polyhydric phenol-formaldehyde and tannin-formaldehyde types. Particularly preferred are the commercially available sulfonated polystyrenes and sulfonated polyhydric phenol-formaldehyde type resins.

The products of this invention are characterized by being stable against gelation for more than one day. This is in contradistinction to prior art products containing silica and hydrous metal oxides which gel practically instantaneously as shown by Archibald Patent 2,435,379, Patrick Patent 1,896,055, and Marisic et al. Patent 2,386,810. Precipitation of a broken-up mass of gel particles is considered to be gelation within the meaning of the present disclosure. Thus, the formation of a dispersed gelatinous precipitate within one day, that is, twenty-four hours, is not characteristic of the products of the present invention.

The existence of gelation can ordinarily be determined by visual observation. A body of the sol may be allowed to stand quiescent for twenty-four hours and the pourability may then be observed. A rigid gel will, of course, not flow at all and a precipitate of gelled particles will be readily observable by reason of its heterogeneous character, especially when the body of liquid is poured. Neither such a rigid gel nor gelatinous precipitate is formed in the products of this invention after aging for twenty-four hours at room temperature.

A conventional method of determining whether gelation has occurred is to pour a body of the aqueous dispersion upon a porous filter paper. If gelling has occurred the rate of filtration will be very slow, whereas if no gel is present the filtration rate will be about that of water.

The mixed oxide solutions of this invention are useful for treating paper to improve wet-strength and printing characteristics. They are also useful for treating textiles to improve snag resistance and other surface frictional characteristics, and as treating agents for hydroxyl-containing natural and synthetic polymers to improve water resistance. The mixed oxides obtained by evaporation of water from the product are efficient catalysts for organic reactions.

The nature of the invention will be better understood by reference to the following illustrative examples. In these examples the processes were carried out at room temperatures, that is, about 22° C., and the measurements given are determinations made at room temperature.

*Example 1*

An influent solution is prepared by mixing at room temperature 250 g. of an aqueous solution containing 0.1 mole of $Na_2SnO_3 \cdot 3H_2O$ per kg. of solution with 750 g. of an aqueous solution of sodium silicate containing 0.33 mole of $SiO_2 + 0.10$ mole $Na_2O$ per kg. of solution. The influent solution, in which the mole ratio of $SiO_2/SnO_2/Na_2O$ is 10/1/4, is passed down through a vertical 2.2 cm. inside diameter glass tube containing 140 g. of a moist solid granular commercial synthetic cation-exchange resin, the sulfonated condensation product of o, m, and p-dihydroxybenzene+formaldehyde, the elemental analysis of which is: $C=34.32\%$, $H=6.08\%$, $S=6.24\%$, $N=0.54\%$, $O=53.82\%$ (by difference). The resin, the bulk of which lies between 14 and 35 mesh in size, is packed in the column to a height of about 60 cm., and is brought to a clean, acidic condition before use by up-washing with 2 liters of $H_2O$. After regeneration by passage down of excess 2% $H_2SO_4$ (1 kg.), followed by up-washing with 2 liters of $H_2O$, it is covered with water, which is finally displaced by the influent solution to be exchanged. The effluent, collected at a steady rate within 50 minutes, without indication of plugging the exchange column, is substantially clear and has a pH of 3.9. A concentrate, prepared by boiling off water from 500 g. of effluent to give a residue of 66 g., is also substantially clear and analyzes 9.19% $SiO_2$, 1.77% $SnO_2$, 0.028% $Na_2O$, 0.028% $SO_4$. This fluid becomes syrupy within about one day and gels in about four days. From the analysis it is calculated that the mole ratio of $SiO_2/SnO_2/Na_2O$ in the effluent is 13/1/0.058, and, allowing for dilution by about 75 g. of water initially covering the resin and the loss of 25 g. of influent because of incomplete drainage at the finish of the process, an approximate yield of 87% on the $SiO_2$ and 67% on the $SnO_2$ is calculated.

*Example 2*

An influent solution is prepared by mixing 750 g. of the sodium stannate solution of Example 1 with 250 g. of the sodium silicate solution of Example 1. The input mole ratio $SiO_2/SnO_2/Na_2O$ in the mixed solution is 1.1/1/1.33. The effluent collected with pH=3.58 contains both $SiO_2$ and $SnO_2$ homogeneously dispersed as colloidal particles. A concentrate (50 g.) is prepared by boiling off water from 500 g. of the effluent. Although the concentration is completed on the third day after preparation of the dilute effluent, the resultant concentrated suspension shows no evidence of gelation. Analysis of the concentrated suspension shows it to contain 3.25% $SiO_2$, 3.38% $SnO_2$ and 0.097% $Na_2O$ by weight. Therefore, the output mole ratio is 2.4/1/0.07 and the yield is about 70% for $SiO_2$ and about 32% for $SnO_2$.

*Example 3*

An influent solution containing 25 g. of potassium columbate ($K_2O=21\%$, $Cb_2O_5=50.5\%$), 475 g. $H_2O$, and 25 g. potassium silicate (21.4% $SiO_2$, 10.85% $K_2O$, 0.12% $Na_2O$, 0.10% $Al_2O_3+Fe_2O_3$) is passed through the exchange column of Example 1. The effluent obtained is a colloidal suspension containing 0.35% $SiO_2$, 0.835% $Cb_2O_5$, and 0.001% $K_2O$.

*Example 4*

An influent solution is prepared by dissolving 5 g. of the potassium columbate of Example 3 in 949.5 g. $H_2O$ with the addition of 45.5 cc. of technical grade sodium silicate (approximate analysis —density=1.4 g./cc., 28.3% $SiO_2$, 8.75% $Na_2O$). Passage of the influent through the column which is prepared as in Example 1, is stopped after about 50 minutes, at which point the effluent has pH of 9.40. The total effluent collected has a pH of 7.51, is slightly hazy and contains 1.40% $SiO_2$, $0.27 \pm .05\%$ $Cb_2O_5$, 0.031% $Na_2O$, and 0.005% $K_2O$. The yield of $Cb_2O_5$ is about 100%, and that of $SiO_2$, 85%. Five hundred grams of the dilute effluent is concentrated to 50 grams with only a slight deposit forming, which is indicative of the good stability of the dilute effluent. A friable pale yellow glassy solid (11.0 g.) is obtained by boiling off water from 500 g. of the effluent in the presence of 3 drops of 3% $H_2O_2$.

*Example 5*

An influent solution, prepared by mixing 125 cc. of a 0.2 molar sodium aluminate solution with 375 cc. of a sodium silicate solution, 0.33 molar in $SiO_2$ and 0.10 molar in $Na_2O$, is passed through the exchange column of Example 1 immediately after mixing. The effluent obtained has a pH of 2.8 and contains 1.25% $SiO_2$, 0.03% $Al_2O_3$ and 0.004% $Na_2O$, which shows a change from an input mole ratio of 10/1/4 to an output ratio of 71/1/0.22.

*Example 6*

An influent solution is prepared by mixing 250 cc. of a 0.2 molar sodium aluminate solution with 250 cc. of a sodium silicate solution (0.33 molar in $SiO_2$ and 0.10 molar in $Na_2O$). Approximately two-thirds of this influent solution is processed through the exchange column of Example 1. The hazy effluent collected has a pH of about 5.6, contains 0.44% $SiO_2$, 0.12% $Al_2O_3$ and 0.02% $Na_2O$. Thus, an input mole ratio of 3.3/1/2 yields an output ratio of 6.2/1/0.27. After 26 days' storage at ambient temperatures the effluent is still fluid, even though it is hazy in appearance.

*Example 7*

An influent solution is prepared by mixing an aqueous solution containing 8 g. $KOH+30$ g. $H_2O$ to which is added 2.5 g. $ZnCO_3$ with a solution consisting of 23 g. of the potassium silicate of Example 3 in 436.5 g. $H_2O$. Although the influent is slightly hazy and becomes more turbid with age, the effluent obtained by passing it through the exchange column of Example 1 in 30 minutes is initially clear at pH 9.5; it contains 0.65% $SiO_2$, 0.046% $ZnO$ and 0.01% of $K_2O$. Thus, an input mole ratio of $SiO_2/ZnO/K_2O$ of 4.1/1/5.55 yields an output of 19.1/1/0.19. At the age of 3 days the effluent is very slightly hazy but has not gelled. It yields a gel upon evaporation.

This application is a continuation-in-part of my co-pending application Ser. No. 790,929 filed December 10, 1947, now abandoned.

I claim:

1. In a process for producing aqueous dispersions containing silicic acid and a hydrous oxide of a metal selected from the group consisting of zinc, aluminum, tin, and columbium, the step comprising effecting contact between a cation-exchange resin and an aqueous solution containing an alkali-metal silicate together with an alkali-metal salt having an anion selected from the group consisting of zincate, aluminate, stannate and columbate ions, the mole ratio of silicate, expressed as $SiO_2$, to zincate, aluminate, stannate or columbate, expressed as the corresponding metal oxide, being at least 1:1.

2. In a process for producing aqueous dispersions containing silicic acid and a hydrous oxide of zinc, the step comprising effecting contact between a cation-exchange resin and an aqueous solution containing an alkali-metal silicate together with an alkali-metal zincate, the mole ratio of silicate, expressed as $SiO_2$, to zincate, expressed as ZnO, being at least 1:1.

3. In a process for producing aqueous dispersions containing silicic acid and a hydrous oxide of aluminum, the step comprising effecting contact between a cation-exchange resin and an aqueous solution containing an alkali-metal silicate together with an alkali-metal aluminate, the mole ratio of silicate, expressed as $SiO_2$, to aluminate, expressed as $Al_2O_3$, being at least 1:1.

4. In a process for producing aqueous dispersions containing silicic acid and a hydrous oxide of tin, the step comprising effecting contact between a cation-exchange resin and an aqueous solution containing an alkali-metal silicate together with an alkali-metal stannate, the mole ratio of silicate, expressed as $SiO_2$, to stannate, expressed as $SnO_2$, being at least 1:1.

5. In a process for producing aqueous dispersions containing silicic acid and a hydrous oxide of a metal selected from the group consisting of zinc, aluminum, tin, and columbium, the step comprising effecting contact between a cation-exchange resin and an aqueous solution containing from 0.1 to 4.0 per cent by weight, calculated as mixed oxides, of an alkali-metal silicate together with an alkali-metal salt having an anion selected from the group consisting of zincate, aluminate, stannate and columbate ions, the mole ratio of silicate, expressed as $SiO_2$, to zincate, aluminate, stannate or columbate, expressed as the corresponding metal oxide, being at least 1:1.

6. In a process for producing aqueous dispersions containing silicic acid and a hydrous oxide of a metal selected from the group consisting of zinc, aluminum, tin, and columbium, the step comprising passing an aqueous solution containing from 0.1 to 4.0 per cent by weight, calculated as the mixed oxides, of an alkali-metal silicate together with an alkali-metal salt having an anion selected from the group consisting of zincate, aluminate, stannate and columbate ions, through a column packed with a cation-exchange resin, the mole ratio of silicate, expressed as $SiO_2$, to zincate, aluminate, stannate or columbate, expressed as the corresponding metal oxide, being at least 1:1.

7. An aqueous dispersion, which is stable against gelation for at least one day, the dispersion comprising a molecularly homogeneous sol containing synthetic, colloidal silica associated with a synthetic colloidal hydrous oxide of a metal selected from the group consisting of zinc, aluminum, tin, and columbium, the mole ratio of silica, expressed as $SiO_2$, to hydrous metal oxide being at least 1:1.

8. An aqueous dispersion, which is stable against gelation for at least one day, the dispersion comprising a molecularly homogeneous sol containing synthetic, colloidal silica associated with a synthetic colloidal hydrous oxide of zinc, the mole ratio of silica, expressed as $SiO_2$, to zinc oxide being at least 1:1.

9. An aqueous dispersion, which is stable against gelation for at least one day, the dispersion comprising a molecularly homogeneous sol containing synthetic, colloidal silica and a synthetic colloidal hydrous oxide of aluminum, the mole ratio of silica, expressed as $SiO_2$, to aluminum oxide being at least 1:1.

10. An aqueous dispersion, which is stable against gelation for at least one day, the dispersion comprising a molecularly homogeneous sol containing synthetic, colloidal silica associated with a synthetic colloidal hydrous oxide of tin, the mole ratio of silica, expressed as $SiO_2$ to tin oxide being at least 1:1.

MAX FREDRICK BECHTOLD.

References Cited in the file of this patent

UNITED STATES PATENTS

| Number | Name | Date |
|---|---|---|
| 2,438,230 | Ryznar | Mar. 23, 1948 |

OTHER REFERENCES

Colloid Chemistry, by J. Alexander, 1946, pp. 1114–1115.

"Ion Exchange," by F. C. Nachod, Academic Press Inc., Publishers, New York, N. Y., 1949, pages 364–367.